United States Patent [19]
Woodier

[11] 3,804,502
[45] Apr. 16, 1974

[54] REVERSING MECHANISM
[75] Inventor: James G. Woodier, Chicago, Ill.
[73] Assignee: Bell and Howell Company, Chicago, Ill.
[22] Filed: July 25, 1972
[21] Appl. No.: 275,067

[52] U.S. Cl. .............................. 352/173, 352/194
[51] Int. Cl. .............................................. G03b 1/00
[58] Field of Search ........................... 352/173, 194

[56] References Cited
UNITED STATES PATENTS
3,261,654   7/1966   Faber ............................ 352/173 X
3,675,995   7/1972   Cherniavsky ...................... 352/173

Primary Examiner—Monroe H. Hayes

[57] ABSTRACT

A reversing mechanism for a motion picture projector having movable gears for changing the phase relationship by 180° of the cams which drive the shuttle. One of the cams is moved 180° to permit the use of this mechanism with a shutter having any number of blades. The movable gears drive the cam when the projector is operating in the reverse mode, but a positive drive from the shutter drives the cam when the projector is operating in the forward direction.

6 Claims, 4 Drawing Figures

3,804,502

3,804,502

REVERSING MECHANISM

BACKGROUND OF THE INVENTION

This invention relates to intermittent feed motion picture projectors and in particular to a reversible intermittent feed motion picture projector.

It is desirable to reverse the direction of film feed in a motion picture projector. However, prior reversing mechanisms have relied upon reversing the drive train motion or have required disengaging mechanisms. Such mechanisms are both costly and complicated.

An improved reversing mechanism was presented in the present assignee's U.S. Pat. No. 3,675,995. In that patent a reversing mechanism is disclosed in which the movement of planetary gears reverses film direction by changing the phase relationship of the in-and-out and up-and-down cams by 180°. However, the embodiment disclosed therein is limited to use with symmetrical shutters having an even number of blades.

SUMMARY OF THE INVENTION

This invention overcomes the disadvantages and limitations of the prior art in presenting a reversing mechanism which may be used with shutters having any number of blades. A shiftable gear train is provided to rotate the up-and-down cam 180° relative to the drive shaft upon which it is rotatably mounted. By moving the up-and-down cam 180° on the drive shaft the same shutter blade is used to block the projection light during film movement in both forward and reverse directions. Thus, the positioning of the remaining blades, if any, is of no consequence and the optium number of shutter blades at a given drive shaft speed may be used.

The up-and-down cam may be driven through the shiftable gear train. However, the positioning of the up-and-down cam with respect to the shutter must be very precise. In this invention, during forward projection, the up-and-down cam is driven by the shutter which is affixed to the drive shaft. During reverse projection the gear train drives the up-and-down cam. Since the projector is operated in a forward mode the majority of the time the bulk of the positioning problems are eliminated.

BRIEF DESCRIPTION OF THE DRAWINGS

The features of this invention will become more apparent in the following description of a preferred embodiment read in conjunction with the FIGURES in which.

DETAILED DESCRIPTION OF A PREFERRED EMBODIMENT

Figure 2:
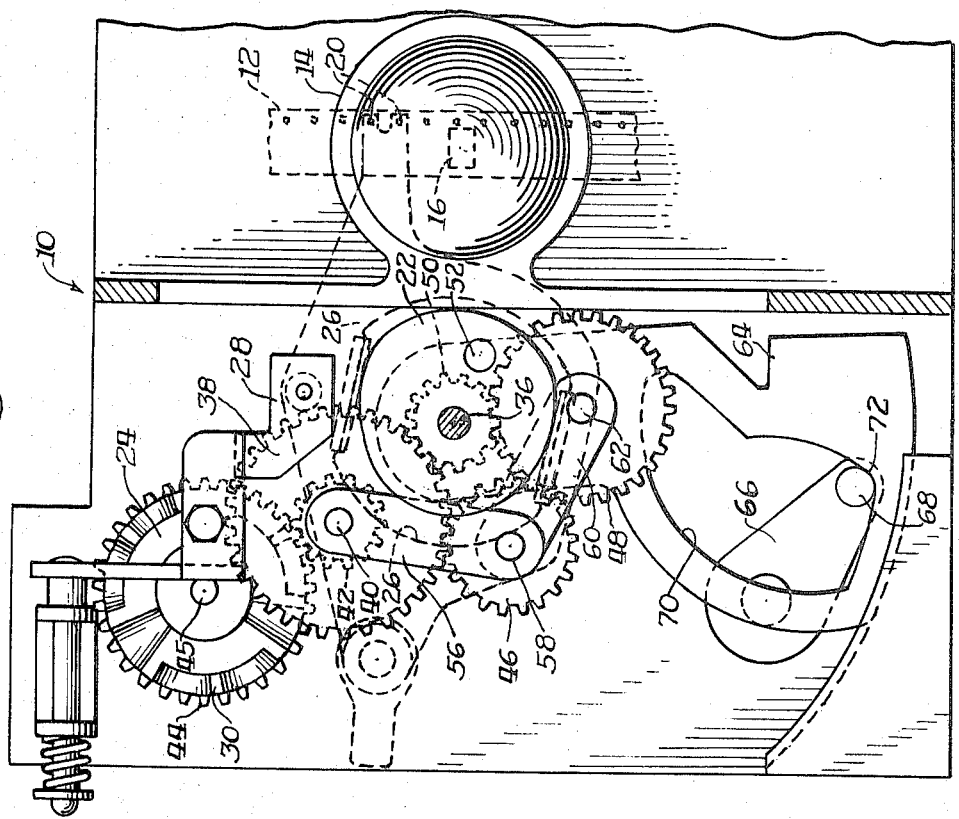
FIG. 2 is a front view of the mechanism shown in FIG. 1, but shown in the reverse mode of operation.

Referring to the Figures, wherein like reference numerals indicate like parts, the film moving portion of an intermittent pull-down projector is indicated generally at 10. A film 12 is positioned in front of a lamp 14 for movement past an aperture 16. The film 12 is intermittently moved by a shuttle 18 having claws 20 that engage holes in the film 12. For purposes of clarity the film 12 and the shuttel have been illustrated in phantom, but it is clear that they are in the front of FIG. 2. The shuttle 18 is mounted for both up-and-down and in-and-out movement.

A shutter 21 is fixed to the drive shaft 36 and may have as many blades as desired. The shutter 21 is riveted 23 to a pulley 25 which is fixed to the drive shaft 36 by a set screw 27. The pulley 25 may be used to drive other parts of the projector.

Motion is imparted to the shuttle 18 by an up-and-down cam 22 and in an in-and-out cam 24. The up-and-down cam 22 rides within an internal cam follower 26 formed in the shuttle 18. A cam follower 28 rides on the raised cam surfaces 30 formed on the in-and-out cam 24 and contacts the shuttle 18.

The cams 22, 24 are driven by a constant speed motor 32 through power transmission elements. A pinion 34 is rigidly connected to a rotatably mounted drive shaft 36. The pinion 34 meshes with an intermediate gear 38 mounted on a fixed axle 40. A reduction gear 42 is fixed to the intermediate gear 38 and meshes with the toothed periphery 44 of the in-and-out cam 24 to rotate it about a fixed axle 45. Thus the rotary motion of the drive shaft 36 is transmitted to the in-and-out cam 24 through gears 34, 38, 42 and 44.

A second set of gears is provided to rotate the up-and-down cam 22 for reversing the projector. A shifting idler gear 46 meshes with intermediate gear 38 and a shifting intermediate gear 48. Gear 48 drives pinion gear 50 which is rotatably mounted on the drive shaft 36. A lug 52 on gear 50 fits in a hole formed in the up-and-down cam 22 which is rotatably mounted on the drive shaft 36. The lug 52 passes through the up-and-down cam 22 and into a somewhat semi-circular cutout 53 formed in the shutter shuttle 21. The cutout 53 includes an edge 55 which is adapted to contact the lug 52 and drive the up-and-down cam 22 when the projector is operated in the forward direction.

To reverse the direction of film transport, the phase relationship of the cams must be changed by 180°. To accomplish reversal in this preferred embodiment, gears 46 and 48 are movably mounted. A pair of links 56 are loosely mounted on axle 40 and the axle 58 which carries idler gear 46. Similarly, a second pair of links 60 are loosely mounted on axle 58 and axle 62 which carries gear 48. Thus, axles 58 and 62 may be moved and of course move the gears 46 and 48 with them.

Figure 1:
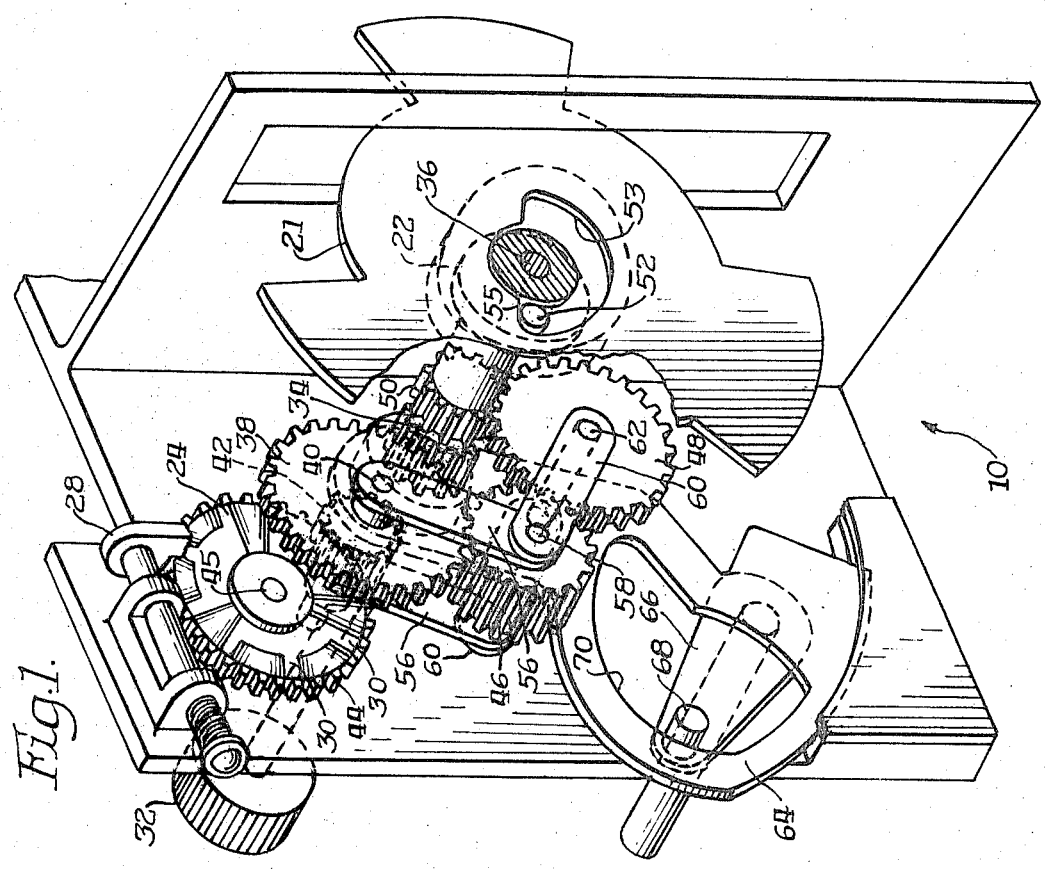
FIG. 1 is a perspective view of a reversing mechanism constructed in accordance with the principles of this invention and illustrated in the forward mode of operation.
Figure 3:
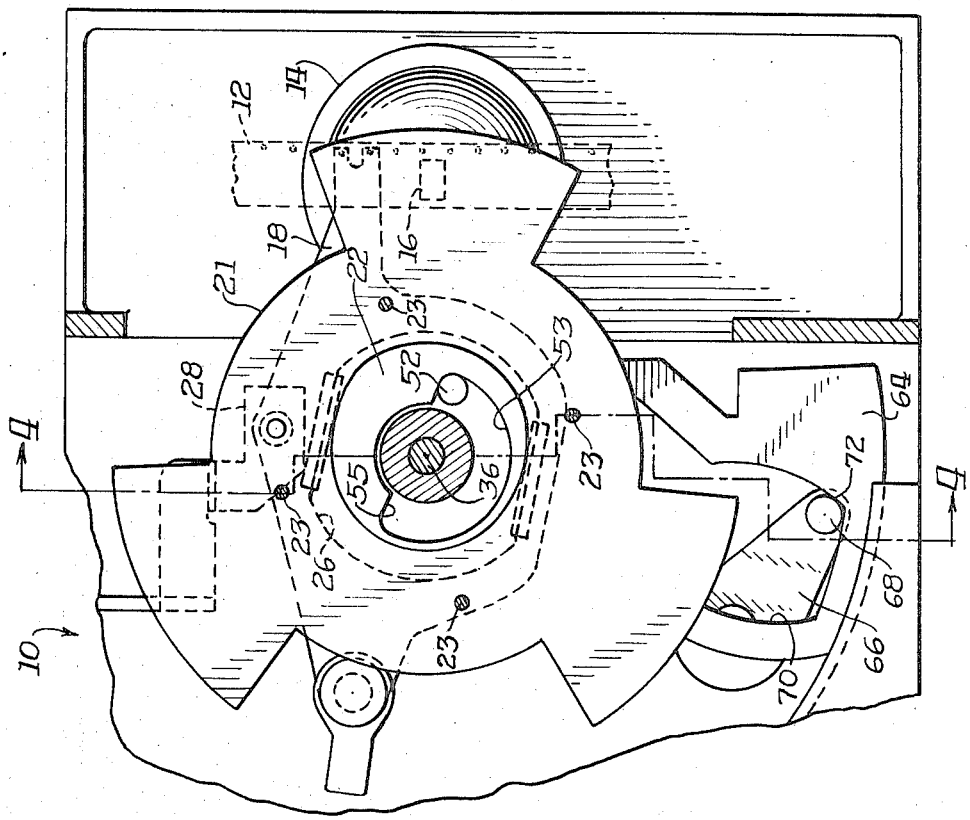
FIG. 3 is a front view as in FIG. 2, illustrating the shutter.
Figure 4:
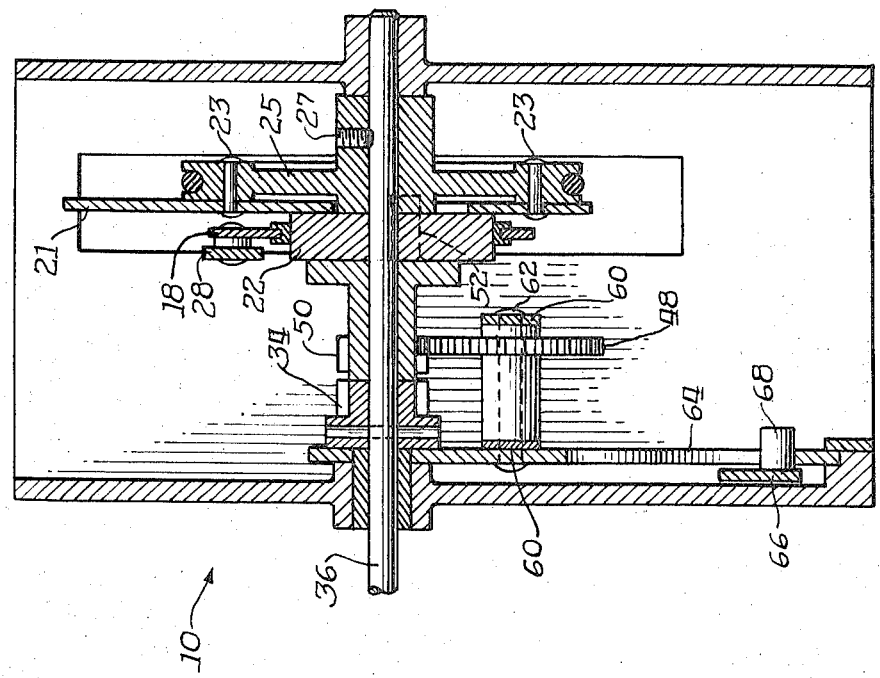
FIG. 4 is a cross-sectional view taken along Line 4—4 in FIG. 3.

To move the gears 46 and 48, a lever 64 is pivoted about the drive shaft 36. The axle 62 which carries gear 48 is rigidly attached to the lever 64. A handle 66 carries a post 68 which rides in an internal cam 70 formed in the lever 64 to shift the lower 64 from a forward projection position as shown in FIG. 1 to a reverse projection position as shown in FIGS. 2 and 3. When in the forward position as shown in FIG. 1 the lever 64 is free to move. However, in the reverse position shown in FIGS. 2 and 3 the lever 64 is fixed by the coaction of the post 68 in the corner 72 of the internal cam 70.

Referring now to FIG. 1, the projector is being operated in the forward mode. The drive shaft 36 rotates counterclockwise and brings the driving edge 55 of the shutter 21 into contact with lug 52 to rotate the up-and-down cam 22. Since the lever 64 is free to move, the shiftable gears 46, 48 can move slightly such that they are not opposing the direct drive by the shutter 21. The position of the shutter 21 can be easily adjusted by the set screw 21 to properly synchronize it with the shuttle 18.

Considering the projector to be turned off and being in the forward mode of operation in FIG. 1, the reversal operation will now be described. As the lever 64 moves from left to right or from the position shown in FIG. 1 to that shown in FIG. 2, idler gear 46 walks around stationary gear 38 and rotates counterclockwise. The counter-clockwise rotation of idler gear 46 rotates intermediate gear 48 clockwise. The clockwise rotation of intermediate gear 48 and also its left-to-right movement cause pinion gear 50 and consequently up-and-down cam 22 to rotate counter-clockwise.

The gears and lever are so arranged to rotate the up-and-down cam 24 through 180° as the lever 64 moves from the left stop 66 to the right stop 68. In this manner a 180° phase change has been effected because the in-and-out cam 24 is stationary. Exactly the same phase change is accomplished if the projector is running because the relative changes remain the same. The projector can be reversed or returned to forward projection without stopping the projector.

Referring to FIGS. 2 and 3, the projector is in the reverse mode as explained above. Considering the projector to be running, the drive shaft 36 and the shutter 21 are rotating counterclockwise. Consequently, the shutter 21 does not drive the up-and-down cam 22 as the shutter 21 is driven in a direction away from the lug 52. In this condition the up-and-down cam 22 is driven through pinion gear 34, intermediate gear 38, shiftable gears 46, 48, pinion gear 50 and lug 52. The shiftable gears 46, 48 are fixed in the position shown in FIGS. 2 and 3 and are not free to move or float as in the forward mode shown in FIG. 1.

In this preferred embodiment the 180° phase change is accomplished by rotating the up-and-down cam 180°. However, it is obvious that either cam can be rotated relative to the other and the phase change could be effected by rotating both cams. Furthermore, only a 180° phase change need be accomplished and that could be done with greater and lesser rotation of appropriately configured cams.

The reversing operation is accomplished rapidly without the need for disengaging any protion of the drive mechanism. Furthermore, because the up-and-down cam is moved 180° relative to the drive shaft the same shutter blade blocks light during film movement regardless of whether the projector is being operated in a forward or reverse direction.

The embodiments of the invention in which an exclusive property or privilege is claimed are defined as follows:

1. A motion picture projector for intermittently advancing a motion picture film past a projection aperture for the successive projection of images on the film comprising in combination:
   a shuttle tooth;
   means for mounting the shuttle tooth for in-and-out and up-and-down movement relative to the projection aperture to intermittently engage and advance the film past the aperture;
   rotary drive means including a drive shaft;
   an up-and-down cam for moving said tooth up and down relative to the aperture;
   an in-and-out cam for moving said tooth in and out relative to the aperture;
   one of said cams being rotatably mounted to said drive shaft;
   reversible drive means for changing the phase relation of said cams by 180° to reverse the film direction including:
   a first gear means for coupling said rotary drive means to one of said cams, and a, second, movable gear means for coupling said first gear means to said rotatably mounted cam to drive said rotatably mounted cam to move film in a reverse direction, means rigidly mounted to said drive shaft for driving said rotatably mounted cam to move film in a forward direction and means for moving said second gear means for rotating said rotatably mounted cam by 180° for shifting the phase relation between said cams by 180° to reverse the direction of movement of the film past the aperture.

2. The projector set forth in claim 1 wherein said first gear means includes a plurality of gears for transmitting the motion of said drive shaft to said in-and-out cam.

3. The projector set forth in claim 2 wherein said second gear means includes a plurality of gears coupling one of said plurality of gears in said first gear means to said up-and-down cam for transmitting the motion of said drive shaft to said up-and-down cam.

4. The projector set forth in claim 3 wherein said means for driving said up-and-down cam during forward projection comprises a lug disposed in a cutout in a shutter affixed to said drive shaft.

5. In an intermittent pull-down motion picture projector the combination comprising:
   a shuttle tooth;
   an in-and-out cam for moving said shuttle tooth;
   an up-and-down cam for moving said shuttle tooth;
   a rotatable drive shaft;
   said up-and-down cam being rotatably mounted to said drive shaft;
   and reversing means for changing the phase relation of said cams by 180° to reverse the direction of film movement including:
   a first gear means coupling said drive shaft to said in-and-out cam, a second movable gear means coupled to said first gear means and said up-and-down cam operable to drive said up-and-down cam only during reverse projection,
   means rigidly affixed to said drive shaft for driving aid up-and-down cam only during forward projection, and means for moving said second gear means to rotate said up-and-down cam by 180° and change the operative drive means, thereby changing the phase relation of said cams by 180° and reversing the direction of film movement.

6. The combination set forth in claim 5 wherein said means for driving said up-and-down cam in said second direction comprises a lug disposed in a cutout in a shutter.

* * * * *

UNITED STATES PATENT OFFICE
CERTIFICATE OF CORRECTION

Patent No. 3,804,502        Dated April 16, 1974

Inventor(s) JAMES G. WOODIER

It is certified that error appears in the above-identified patent and that said Letters Patent are hereby corrected as shown below:

Column 2, line 14, after "22 and" delete "in".
          Line 38, after "formed in the" delete "shuttle"
          Line 56, after "to shift the" change "lower" to read --lever--.

Signed and Sealed this fourth Day of May 1976

[SEAL]

Attest:

RUTH C. MASON
Attesting Officer

C. MARSHALL DANN
Commissioner of Patents and Trademarks